United States Patent
Edwards

(10) Patent No.: US 9,053,473 B2
(45) Date of Patent: Jun. 9, 2015

(54) TECHNIQUES FOR ASSISTED SELF CHECKOUT

(75) Inventor: Thomas V. Edwards, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 289 days.

(21) Appl. No.: 12/802,132

(22) Filed: May 28, 2010

(65) Prior Publication Data

US 2011/0295704 A1 Dec. 1, 2011

(51) Int. Cl.

| G06Q 20/18 | (2012.01) |
| G06Q 20/20 | (2012.01) |
| G07G 1/00 | (2006.01) |
| G06Q 30/06 | (2012.01) |
| G06Q 30/02 | (2012.01) |
| G06Q 20/00 | (2012.01) |
| G06Q 20/12 | (2012.01) |
| G06Q 20/32 | (2012.01) |

(52) U.S. Cl.
CPC .............. *G06Q 20/18* (2013.01); *G06Q 20/32* (2013.01); *G06Q 20/322* (2013.01); *G06Q 20/00* (2013.01); *G06Q 20/12* (2013.01); *G06Q 20/208* (2013.01); *G06Q 30/02* (2013.01); *G06Q 30/06* (2013.01); *G07G 1/0081* (2013.01)

(58) Field of Classification Search
CPC ........ G06Q 20/20; G06Q 20/12; G06Q 20/18; G06Q 20/32; G06Q 20/322; G06Q 30/06; G06Q 20/208; G06Q 30/02
See application file for complete search history.

(56) References Cited

U.S. PATENT DOCUMENTS

| 5,353,218 | A | * | 10/1994 | De Lapa et al. ............ 705/14.25 |
| 5,804,807 | A | * | 9/1998 | Murrah et al. ................ 235/383 |
| 6,382,357 | B1 | * | 5/2002 | Morrison et al. ............... 186/61 |
| 6,619,546 | B1 | * | 9/2003 | Nguyen et al. ................ 235/383 |
| 6,997,382 | B1 | * | 2/2006 | Bhri .............................. 235/383 |
| 2003/0121974 | A1 | * | 7/2003 | Blanford et al. ............. 235/383 |
| 2004/0199432 | A1 | * | 10/2004 | Iwase et al. ..................... 705/26 |

* cited by examiner

*Primary Examiner* — Asfand Sheikh
(74) *Attorney, Agent, or Firm* — Joseph P. Mehrle

(57) ABSTRACT

Techniques for assisted self checkout are provided. Customers or store personnel use scan devices that are independent of a self-checkout kiosk as they shop in a store to scan goods that are to be purchased. The transactions are independent of any particular checkout terminal. When the customer is ready to checkout, the customer approaches a checkout station and the transaction for the customer is located and recalled. The customer completes payment at the station to end the transaction and exit the store.

9 Claims, 3 Drawing Sheets

TECHNIQUES FOR ASSISTED SELF CHECKOUT

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, grocery stores, department stores, and the like.

Store kiosks were originally created to alleviate the need for excessive store personnel to check out the customers from stores. For the most part this worked and stores reduced the number of costly cashiers employed by the stores. However, more often than not the bottleneck in the stores are the self checkout kiosks as customers attempt to use them properly; store personnel attempt to assist the customers in using them; and as full service checkout lanes diminish from the stores in greater numbers.

In short, self checkout kiosks are the victim of their own success because the popularity has been so well received the traditional model and usage of these kiosks increasingly becomes the area where improved efficiency is needed.

SUMMARY

In various embodiments, techniques for assisted self checkout are presented. According to an embodiment, a method for assisted self checkout is provided. An identifier for a transaction is received and scan details are acquired for goods that a customer is purchasing. The scan details are received independent of any particular checkout terminal and received at the direction of the customer or store personnel before the customer checks out. Next, the scan details and the identifier are stored until subsequently recalled for checkout at a payment terminal.

DETAILED DESCRIPTION

Figure 1:
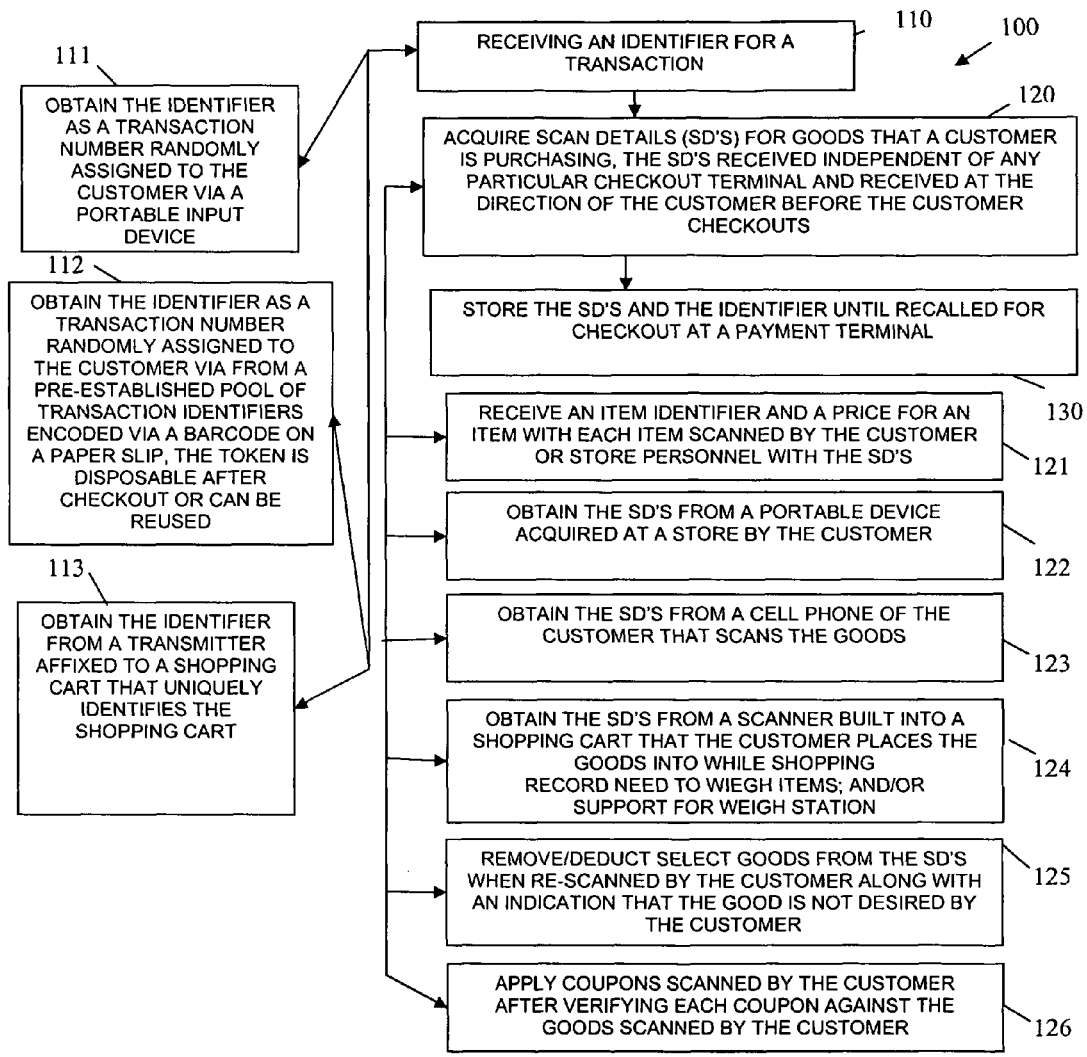
FIG. 1 is a diagram of a method for automated self or assisted checkout, according to an example embodiment.

FIG. 1 is a diagram of a method 100 for automated self checkout, according to an example embodiment. The method 100 (hereinafter "item scan service") is implemented as instructions residing on a non-transitory computer-readable storage medium and executed by one or more processors. The processors are specifically configured to process the item scan service. The item scan service operates over a network. The network is wireless or a combination of wired and wireless.

In an embodiment, the item scan service executes on processors embedded within a portable device. The portable device can be a cell phone with the item scan service executing thereon. In another case, the item scan service executes on processors associated with a portable device distributed by a store to customers to perform self scanning while inside the store. In yet another case, the item scan service is executed on processors embedded within a scanner that is integrated into a store shopping cart that the customer places goods into while shopping at the store.

In an alternative scenario, the item scan service executes on processors that are located on a remote processing server associated with the enterprise and the portable device used by the customer to self scan goods being purchased communicates the scan details (discussed below) via wireless communication within the store.

So, the item scan service can be implemented within the scanner used by the customer or store personnel to perform self scanning within the store or can be implemented independent of the scanner on a remote processing server of the store that communicates with the scanner.

The scanning of the customer items may be performed by store personnel at any time after the customer completes item selection in the store until the point the customer reaches the checkout terminals. In one embodiment, the store personnel monitor queues of customers waiting in line for access to payment terminals and intervene with the item scan devices to pre-scan the customers' selected items.

At 110, the item scan service receives an identifier for a transaction. Moreover, the identifier is used for goods that the customer wants to purchase in the store. The goods associated with the transaction are not scanned at the self-service checkout terminal or kiosk or by a full service (cashier-based terminal).

The identifier can be received in a variety of manners.

For example, at 111, item scan service obtains the identifier as a transaction number, which is randomly assigned to the customer via a portable input device (cell phone, portable scanner, etc.).

In another situation, the store personnel provide a disposable or reusable token selected randomly from a pre-established set of tokens. The token may be a simple slip of paper with a barcode printed thereon or a token may contain an RFID tag, or other machine-readable identifier.

In another situation, at 112, the item scan service obtains the identifier as a customer loyalty number scanned from a loyalty card or manually keyed into a portable input device from the customer.

In still another case, at 113, the item scan service obtains the identifier from a transmitter affixed to a shopping cart that uniquely identifies the shopping cart. So, the transaction identifier can initially be anonymous from the perspective of the identity of the customer and based on the identity of the shopping cart being used by the customer. Other factors can augment the transaction identifier, such as date and time the cart is used along with the identity of the shopping cart.

At 120, the item scan service acquires scan details for goods that the customer is purchasing. Again, the scan details are received independent of any particular checkout terminal; and the scan details are received at the direction of the customer or store personnel before the customer checks out, or before the customer is present at any particular checkout terminal.

According to an embodiment, at 121, the item scan service receives an item identifier and a price for the item with each item scanned by the customer with the scan details. The additional information for each item may include a description, price, department, tax, loyalty points earned, discounts earned but must include the item code allowing the item to later be identified to the payment terminal. In one embodiment, each item may be viewed as one of the goods associated with the scan details. In another embodiment only the counted items is indicated. The scan details can include a variety of additional data, such as serial number for each item, date and time of item purchase, store location with each item, sale information, inventory information, ordering information, and other data.

In a scenario, at 122, the item scan service obtains the scan details from a portable device acquired at the store by the customer or store personnel. This was mentioned above; the scanner used by the customer or store personnel may be provided by and available at the store.

According to an embodiment, at 123, the item scan service obtains the scan details from a cell phone of the customer that scans the goods. In this case, an application (App) can be executed on the customer phone so as to ensure security and avoid customer tampering and to also authenticate the customer via the App.

The item scan service may allow or provide optimizations for recording the items to be sold such as entering the quantity of an item then the scan details of that item. In such a case, the item scan service will automatically replicate the item, the number of items indicated by the quantity entered, or if the retail sale's system allows actually record the quantity as part of the item details.

The item scan service may also provide special handling of the items that are sold by weight. In one embodiment, the items may be scanned by the item scan service than later weighted at the payment terminal to determine the actual item cost. In another embodiment, the item scan service can simply record the number of weight items to be presented later at the payment station. In yet another embodiment, a weight station can be used to determine the weight of such items and that weight can be communicated to the item scan service by electronic means associated with the same transaction token.

In yet another case, at 124, the item scan service obtains the scan details from a scanner that is built into or integrated with a shopping cart that the customer places goods into while shopping at the store. Here, the scanner can be optical based or in some cases radio frequency (RF) based, where the goods within the store include a radio frequency identifier (RFI) tag. In cases, were the built in scanner is RF based, the customer has only to place goods in the shopping cart and the RFI tag is automatically scanned and read as part of the scan details. In this manner, the scan details can be optical based or in some cases even RF based.

In still another situation, at 125, the item scan service removes or deducts select goods from the scan details when such goods are re-scanned by the customer along with an indication that the good is no desired by the customer any longer. This may occur frequently in a store. For example, suppose a mother brings a child to the store and notices that the child has scanned or placed items into the shopping cart that do not belong there. A mechanism exists to adjust the scan details when items are no longer desired and the customer does not wish to purchase them.

According to an embodiment, at 126, the item scan service applies coupons scanned by the customer or store personnel. The coupons may be verified immediately against the items scanned, later at the payment terminal or at both points. Such validation may be performed by the customer, store personnel or automatically by the item scan service. The physical coupon may not always be needed, such as when the coupon has a serial number and can be flagged as used once scanned. Moreover, since the scan details are present checks can be made to ensure any scanned coupon is valid before permitting its use. If some coupons do require the customer to part with physical possession then these can be collected at the checkout terminal when the customer finally is ready to check out of the store.

At 130, the item scan service stores the scan details and the identifier until recalled for checkout at a payment terminal. Recall can be achieved via the identifier or via other identifiers that can be linked to the identifier (such as loyalty number of customer, customer phone number, and the like).

The process of checking out once the goods are all self scanned by the customer or scanned by store personnel is described more completely below with reference to the method 200 of the FIG. 2.

Figure 2:
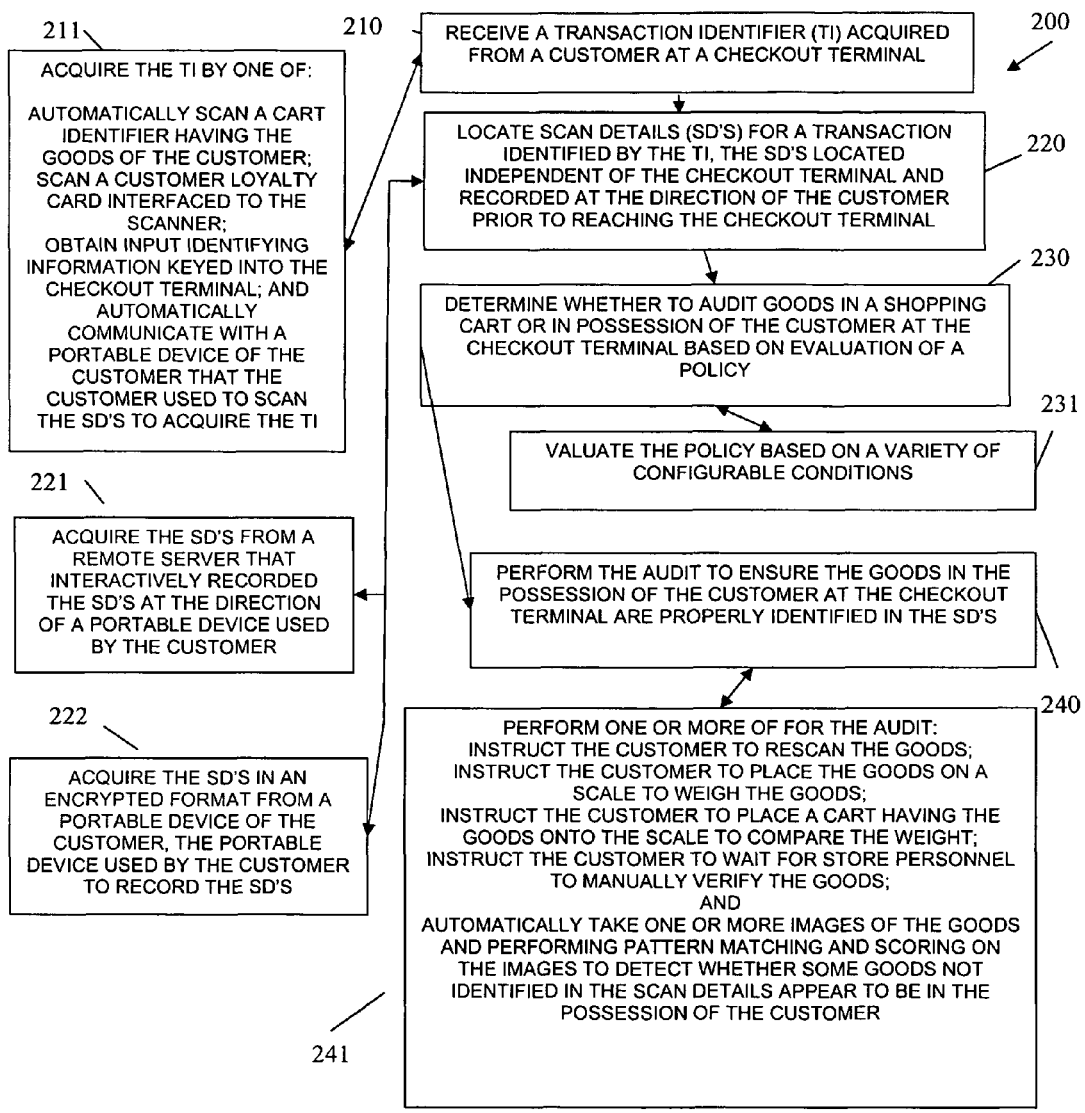
FIG. 2 is a diagram of another method for automated self or assisted checkout, according to an example embodiment.

FIG. 2 is a diagram of another method 200 for automated self checkout, according to an example embodiment. The method 200 (hereinafter "self checkout service") is implemented as instruction within a non-transitory computer-readable storage medium that execute on one or more processors, the processors specifically configured to execute the self checkout service. The self checkout service is operational over a network; the network is wired or a combination of wired and wireless.

The self checkout service presents more details associated with concluding the actions of a transaction at a checkout terminal within a store than what was described above with the item scan service. So, the self checkout service may be viewed as an enhancement version of the item scan service.

At 210, the self checkout service receives a transaction identifier acquired from a customer at a checkout terminal. Again, the scan details associated with goods that the customer is purchasing at the checkout terminal were done while the customer shopped in the store and not while at the checkout terminal (which is the traditional approached used where customers scan goods at the checkout terminal). Details and variations on this self scanning were provided above with reference to the method 100 of the FIG. 1.

In another embodiment, assisted service payment terminals may also use the stored item lists created by the item scan service to eliminate the need to scan every item at the assisted checkout terminal.

According to an embodiment, at 211, the self checkout service acquires the transaction identifier in one of a variety manners, such as: by automatically scanning a cart identifier having the goods of the customer as the cart passes in front of a scanner; scanning a preprinted paper slip containing a random transaction identifier or other readable physical token provided by store personnel; scanning a customer loyalty cared, the loyalty card interfaced to the scanner by the customer at the checkout terminal; obtaining input identifying information keyed into the checkout terminal by the customer, the identifying information associated with the transaction identifier; and/or automatically communicating with a portable device of the customer that the customer used to scan the scan details to acquire the transaction identifier.

At 220, the self checkout service locates scan details for a transaction associated with the transaction identifier. The scan details are independent of the checkout terminal and recorded at the direction of the customer or store personnel prior to reaching the checkout terminal. It is important to note that the customer could choose any self-service checkout terminal (kiosk) in the store because the scan details are dynamically acquired by the chosen terminal when the customer checks out and the scan details are not directly tied to any particular checkout terminal. Again, the goods scanned and identified in the scan details were scanned prior to reaching the checkout terminal chosen by the customer and while the customer was shopping for the goods within the store, possibly by store personnel while the customer waited in line for access to a payment terminal.

In a scenario, at 221, the self checkout service acquires the scan details from a remote server that interactively recorded the scan details at the direction of a portable device used by the customer or store personnel. Here, the scan details are housed on store's server based on transmissions from the portable device, which may be consumer owned or store provided (as described above).

In an embodiment, at 222, the self checkout service acquires the scan details in an encrypted format from a portable device of the customer or the store. The portable device used by the customer or store personnel to record the scan details. For example, suppose the customer has a cell phone with an integrated camera and scan software; these resources when combined with the processing app described herein permit the scan details to be encrypted and securely stored on the customer's phone and recalled when needed. Authentication and decryption can occur between the cell phone and the checkout terminal as needed and desired.

So, the store does not have to have the scan details in its possession until checkout is desired; rather the processing, assembling, and storing of the scan details can all be managed and controlled by a consumer-based device, such as a cell phone. Although as noted, in some cases audit tracking and the scan details are captured on a server of a store in a dynamic fashion. Either scenario can exist or both can exist depending up features of consumer devices and policies of the stores.

At 230, the self checkout service determines whether to audit goods in a shopping cart or in possession of the customer at the checkout terminal based on evaluation of a policy. That is, the store is assuming that customers are honest and not deceitful in some of this process, just as they do today anyway with the traditional self-scanning checkout terminals. But some individuals are not honest or some individuals may be honest but just make honest mistakes that need correction. A mechanism to ensure audits are performed is provided when the customer checks out at the checkout terminal. The decision to perform an audit can be achieved based on evaluation of policy and the policy can account for a variety of factors and situations.

For example, at 231, the self checkout service evaluates the policy based on one or more conditions associated with: a frequency with which the customer has performed self-checkouts before within the store; a loyalty level assigned to the customer (higher value customers less likely to receive audits); the history of prior audit results for this customer; specific goods identified in the scan details of the transaction (small goods of high value, such as electronic games, storage cards, and the like); a total number of the goods identified in the scan details of the transaction (only a few goods can be audited real quickly in an automated manner that is less intrusive to the customer); a total value of a sum of the goods indentified in the scan details (high price may warrant an audit); a customer traffic metric for a store having the checkout terminal when the customer checks out at the checkout terminal (is the store really busy or really slow); a time of day that the customer is attempting to check out (is it 10 am on a Sunday or 3 am on a Saturday morning); a random instruction automatically generated to perform the audit (every 10 customers are audited or based on an algorithm every transaction with certain attributes are audited); and/or a calendar day that the customer is attempting to checkout (is it a Friday evening or is it a Saturday morning, is it St. Patrick's day at a university or is it Christmas Day near a retirement village).

In fact, a variety of configured conditions can be used to evaluate the policy and determine whether an audit is appropriate or not appropriate.

The audit validates that the scan details for some or all of the goods that the customer says he/she is buying matches what is in possession of the customer when the customer is checking out at the checkout terminal. The store personnel may rescan all or some of the items, possibly selecting only high-value items for rescan. The audit passes if all the rescanned items are found on the item receipt.

The audit decision is commonly made by the self-checkout system at the payment terminal when the user presents the identity token for recall of the scan details. The audit decision can be made by a system separate from the self-checkout system, such as a system with cameras monitoring the passing of arts identified with remotely readable transaction identifiers (e.g., RFID tags, visual coding affixed to the cart, etc.).

So, at 232, when the policy warrants an audit, the self checkout service performs the audit to ensure the goods in the possession of the customer at the checkout terminal are properly identified in the scan details generated at the direction of the customer while the customer was in the store selecting goods for purchase.

According to an embodiment, at 233, the self checkout service can cause a specific type of audit to be performed in a number a manners, such as but not limited to: instructing the customer to rescan the goods in possession of the customer at the checkout terminal using a scanner of the checkout terminal; instructing the customer to place the goods on a scale to weight the goods and then compare a weight for the goods against an expected weight in view of the scan details; instructing the customer to place a cart having the goods onto the scale to compare the weight for the goods calibrated for a cart weight against the expected weight; instructing the customer to wait for store personnel to manually verify the goods in possession of the customer at the checkout terminal; and/or automatically taking one or more digital images of the goods within the possession of the customer and performing image pattern matching and scoring techniques on the identified images of the goods for purposes of detecting whether some goods not identified in the scan details appear to have an image signature in the images and thus appear to be improperly in the possession of the customer.

At 240, the self checkout service receives payment from the customer via the checkout terminal to conclude the transaction. This can occur in manners used today at self-service checkout kiosk terminals, via cash, debit, credit, check, and the like.

It is also noted that a mechanism may be in place where the checkout terminal queries the customer before receiving payment to ask if there are any items not scanned that the customer now has in the cart and if so the customer can manually scan those items before an audit determination is made and before payment is made. This gives a customer a chance to refresh their memory and to come clean if they have been less than honest while scanning their goods into the scan details.

The customer may be given an opportunity to add additional items to the shop once reaching the payment station. Retailers commonly place so-called "impulse items," such as candy and magazines in the proximity of the payment stations. Such items may be added to the transaction after the pre-scanned items are processed.

The customer may be directed to weight certain items that are sold by weight, e.g. produce items. In such configurations, the payment station will include a legal weighing scale to be used by the self-service application to determination of the proper item pricing.

Figure 3:
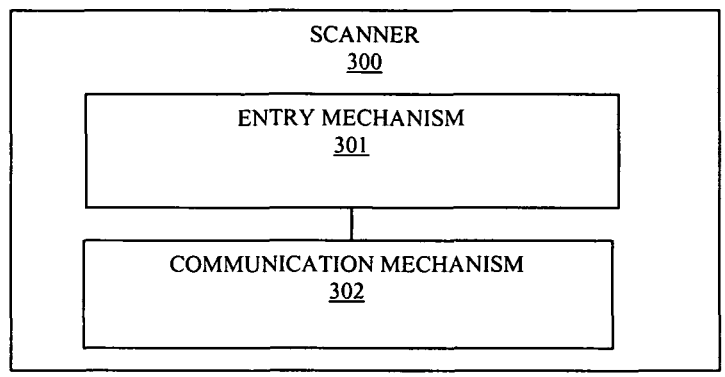
FIG. 3 is a diagram of a scanner used for automated self or assisted checkout, according to an example embodiment.

FIG. 3 is a diagram of a scanner 300 used for automated self checkout, according to an example embodiment. The scanner 300 includes one or more processors that are specifically configured to perform, inter alia, the processing associated with the methods 100 and 200 of the FIGS. 1 and 2, respectively. The scanner 300 includes a variety of other hardware components, such as network adapters, memory, display screen, input mechanisms, and the like.

The scanner 300 includes an entry mechanism 301 and a communication mechanism 302. Each of these and their interactions with one another will now be discussed in turn.

The entry mechanism 301 can include a digital camera, key input buttons, a track ball for selecting information on a screen of the scanner 300, a touch screen having information selected thereon, and/or a microphone integrated with voice recognition software for the customer to audibly communicate information.

The entry mechanism 301 is configured to be operated by a customer within a store to initiate a transaction. The transaction is independent of any particular store-based checkout terminal. The entry mechanism 301 is also configured to record scan details for goods that the customer plans to purchase at a checkout terminal before concluding a transaction with the store.

The communication mechanism 302 is configured to communicate information from and to the scanner 100. The information can be communicated to other devices over a wireless network, such as the checkout terminal or a store-based enterprise server, and information can be communicated from the checkout terminal or server back to the scanner 300 via the communication mechanism 302.

So, the communication mechanism 302 is configured to communicate a transaction identifier for the transaction and the scan details to the checkout terminal and/or the remote server. In cases, where the identifier and scan details are communicated to the remote server, the remote server subsequently communicates with the checkout terminal to supply the transaction identifier and scan details at checkout by the customer.

According to an embodiment, the scanner 300 is one of: a cell phone of the customer, a portable device supplied by the store to the customer, a shopping cart having the scanner integrated therein, or one of many standalone scanner units placed throughout the store for access by the customer and other customers and each good scanned includes the transaction identifier for the transaction being monitored at the standalone scanner units. So, with the scanner units a store supplies stand alone scanners 300 throughout the store and as customers buy goods they scan them at one of the units and provide a particular transaction identifier so each customer's running transaction of scan details is managed separately and independently within the store.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a processor configured to execute the method, comprising:
   receiving from a customer's cell phone an identifier for a transaction where the identifier also identifies goods associated with the transaction and where the goods are not scanned at any particular checkout terminal and where a customer scans at least a portion of the goods;
   acquiring scan details for goods associated with the identifier that the customer is purchasing, wherein the scan details are received from the customer's cell phone and the scan details are received at the direction of the customer before the customer is present at any particular checkout terminal and wherein the scan details includes coupons scanned by the customer and providing special handling for particular items associated with the scan details that are sold by weight delaying weight of those particular items until the customer is at the checkout terminal;
   applying the coupons scanned by the customer after verifying each coupon matches one of the goods scanned by the customer; and
   storing the scan details and the identifier until recalled for checkout at a payment terminal.

2. The method of claim 1, wherein receiving further includes obtaining the identifier as a transaction number randomly assigned to the customer via from a pre-established pool of transaction identifiers encoded via a barcode on a paper slip, the token is disposable after checkout or can be reused.

3. The method of claim 1, wherein receiving further includes obtaining the identifier as a customer loyalty number scanned from a loyalty card or manually keyed into a portable input device from the customer.

4. The method of claim 1, wherein receiving further includes obtaining the identifier from a transmitter affixed to a shopping cart that uniquely identifies the shopping cart.

5. The method of claim 1, wherein acquiring further includes receiving an item identifier and a price for an item with each item scanned by the customer or store personnel with the scan details.

6. The method of claim 1, wherein acquiring further includes obtaining the scan details from a portable device acquired at a store by the customer.

7. The method of claim 1, wherein acquiring further includes:
   obtaining the scan details from: a scanner built into a shopping cart that the customer places the goods into while shopping;
   recording of a need to weight items at the checkout terminal; and/or
   support for a standalone item weighing station providing item weights associated with an identity token.

8. The method of claim 1, wherein acquiring further includes removing or deducting select goods from the scan details when re-scanned by the customer along with an indication that the good is not desired by the customer.

9. A cell phone based scanner, comprising:
   an entry mechanism that is a camera configured to read a bar code; and
   a communication mechanism;
   wherein the entry mechanism is configured to be operated by a customer within a store to initiate a transaction that is independent of any particular checkout terminal and the entry mechanism further configured to record scan details for goods and coupons associated with the transaction that the customer plans to purchase at a checkout terminal before arriving at any particular checkout terminal to conclude the transaction, and the communication mechanism configured to provide special handling for particular items that are sold by weight that delays weighing those particular items until at the checkout terminal, the communication mechanism configured to communicate a transaction identifier for the transaction and the scan details to a remote server that subsequently is queried by the checkout terminal with the transaction identifier to obtain the scan details at checkout by the customer, wherein the scan details include at a minimum an item code for a particular good used to identify that particular good to a store's sales system, other scan details include one or more of: item description, price, discounts or loyalty points earned, food stamp eligible, and/or totals due by the customer.

* * * * *